(12) United States Patent
Tajnafői et al.

(10) Patent No.: US 8,016,298 B2
(45) Date of Patent: Sep. 13, 2011

(54) CHUCK FOR FLEXIBLE MANUFACTURING

(76) Inventors: József Tajnafői, Budapest (HU); József Gaál, Kecskemét (HU); József Kertész, Kecskemét (HU)

( * ) Notice: Subject to any disclaimer, the term of this patent is extended or adjusted under 35 U.S.C. 154(b) by 1008 days.

(21) Appl. No.: 11/660,864

(22) PCT Filed: Aug. 25, 2005

(86) PCT No.: PCT/HU2005/000091
§ 371 (c)(1),
(2), (4) Date: Oct. 9, 2007

(87) PCT Pub. No.: WO2006/021823
PCT Pub. Date: Mar. 2, 2006

(65) Prior Publication Data
US 2008/0061520 A1 Mar. 13, 2008

(30) Foreign Application Priority Data
Aug. 25, 2004 (HU) .................................. 0401743

(51) Int. Cl.
*B23B 31/16* (2006.01)
(52) U.S. Cl. ....... 279/121; 279/4.12; 279/120; 279/123; 279/140; 279/141
(58) Field of Classification Search .............. 279/66, 279/120–122, 140, 4.1, 4.12, 2.12, 2.19, 279/2.11
See application file for complete search history.

(56) References Cited

U.S. PATENT DOCUMENTS

| | | | |
|---|---|---|---|
| 3,542,386 A | | 11/1970 | Wolfgang |
| 3,858,893 A | * | 1/1975 | Ovanin ............................ 279/17 |
| 4,026,566 A | * | 5/1977 | Rohm ............................ 279/121 |
| 4,123,075 A | * | 10/1978 | Rosewarne et al. ............ 279/121 |
| 4,200,300 A | * | 4/1980 | Rohm ............................ 279/124 |
| 4,240,645 A | * | 12/1980 | Rohm ............................ 279/130 |
| 4,243,236 A | * | 1/1981 | Rohm ............................ 279/110 |
| 4,243,237 A | * | 1/1981 | Rohm ............................ 279/121 |

(Continued)

OTHER PUBLICATIONS

International Search Report and Written Opinion mailed Dec. 2, 2005 in corresponding International Application Serial No. PCT/HU2005/000091 filed Aug. 25, 2005.

*Primary Examiner* — Eric A Gates
*Assistant Examiner* — Bayan Salone
(74) *Attorney, Agent, or Firm* — Davidson, Berquist, Jackson & Gowdey, LLP

(57) ABSTRACT

The invention relates to a chuck for flexible manufacturing, said chuck comprising a chuck body, a central draw head guided axially in a central hole of the chuck body and connected to inner jaws radially guided in the chuck body through a straight-wedge mechanism, and outer jaws also radially guided in the chuck body and adapted to be equipped with chuck jaws for chucking a work-piece and to be engaged with coupling heads through rack teeth. The coupling heads are built in the inner jaws and guided axially therein, wherein said coupling heads comprise a double locking coupling device. The first locking stage of said coupling device includes wedge-shaped control members fixed to a control ring, whereas the second locking stage includes an additional locking member directly connected to the control ring. The chuck body is in the form of a one-piece unit, wherein the control ring is encased by the chuck body and the rear centering disc so that the control ring can be rotated there-between. and the locking member of the second locking stage is in the form of a cylindrical stud-shaped lock guided in an axial hole of the control ring, said lock being connected, in its locked state, through its front surface, to an axially guided push-rod, wherein said push-rod is arranged in an entirely closed hole of the chuck body.

8 Claims, 4 Drawing Sheets

U.S. PATENT DOCUMENTS

Figure 1:
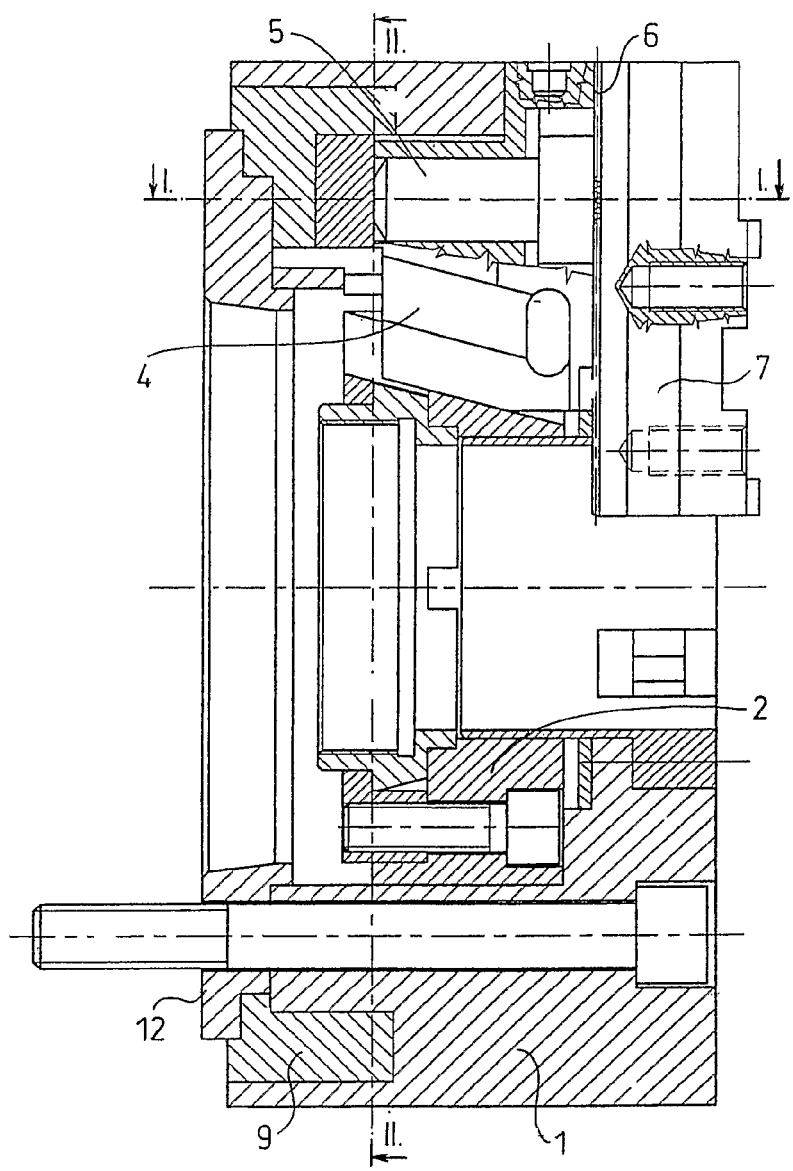

| | | | |
|---|---|---|---|
| 4,362,306 A * | 12/1982 | Rohm | 279/121 |
| 4,725,065 A * | 2/1988 | Hiestand | 279/123 |
| 4,872,691 A * | 10/1989 | Rohm | 279/123 |
| 4,877,259 A | 10/1989 | Rohm et al. | |
| 5,143,686 A * | 9/1992 | Shimizu | 279/110 |
| 6,116,617 A * | 9/2000 | Kofler | 279/133 |
| 6,343,797 B1 * | 2/2002 | Tajnafoi et al. | 279/130 |
| 6,397,712 B1 * | 6/2002 | Rohm | 82/165 |
| 6,409,182 B1 * | 6/2002 | Taglang | 279/132 |
| 6,464,235 B2 * | 10/2002 | Rohm | 279/123 |
| 6,527,279 B2 * | 3/2003 | Tagland | 279/4.02 |
| 6,811,618 B2 * | 11/2004 | Kuroda | 134/33 |
| 6,953,198 B2 * | 10/2005 | Onyszkiewicz et al. | 279/141 |
| 7,040,629 B2 * | 5/2006 | Horisberger | 279/4.12 |

\* cited by examiner

CHUCK FOR FLEXIBLE MANUFACTURING

The invention relates to a chuck for flexible manufacturing, wherein the chuck comprises a chuck body having a cylindrical lateral surface, a central drawhead guided axially in a central hole of the chuck body and being movable through a hole of the main spindle of the machine tool supporting the chuck and further connected to inner jaws radially guided in the chuck body through a straight-wedge mechanism. The chuck further comprises outer jaws also radially guided in the chuck body and adapted to be equipped with chuck jaws for chucking a work-piece and, through their rack toothings, to be engaged with and disengaged from the rack toothings of coupling heads which are built in the inner jaws and guided axially therein. The coupling heads comprise a double locking coupling device, the first locking stage of said coupling device includes wedge-shaped control members fixed to a control ring, said control members being engaged with surface areas formed on the inner front surface of the axially movable coupling heads, whereas the second locking stage includes an additional locking member directly connected to the control ring. In one coupling position of the coupling device, the surface areas of said additional locking member are engaged with the chuck body or a centring disc fixed to the chuck body. In the other coupling position of the coupling device, said surface areas are engaged with stationary surface areas of the machine tool supporting the chuck.

Chucks with great gripping force have been mainly developed for serial and mass production. The wedge-shaped or lever-arm based mechanism of such chucks can position the chuck jaws only within a limited range, therefore the jaws should be often adjusted or replaced when the diameter of the work-piece changes. However, flexible manufacturing is characterized by the fact that the machine tool can easily adapt to work-pieces with different diameters. With respect to the chucks, the change of the work-piece is represented by a change in their diameter. Up to now, no chucks for flexible manufacturing have been developed with the capability of automated and flexible adaptation to the varying diameters of the work-pieces.

The most common modes to adjust chuck jaws to different diameter ranges include manual operations or human actions, such as a manual replacement of the jaws followed by their orientation with rack-gear teeth and their fixation by bolts. Such operations, however, cannot be regarded as either flexible or automated, of course. Manual interventions are unacceptably slow and thus feasible only in major serial manufacturing processes.

A manually adjustable engagement of jaws is described in DE Pat. No. 1288872 of Forkhardt Co. (Werkstatt und Betrieb 106, 173/11-895 p.)

In order to accelerate the change of the gripping range, methods for quick replacement of jaws have been developed, which also require manual interventions. The quickness of these methods is just relative, because, for example, each of the jaws is to be adjusted individually (therefore it requires thrice the time than that of a simultaneous automated adjustment), the door of the work space is to be opened and then closed on every occasion, and the human subjectivity also degrades the quickness when one performs any operational step of a replacement after detecting the need of the replacement.

An automated method for changing the gripping range is the robotically assisted automatic jaw replacement. A chuck construction suitable for such replacement is disclosed in patent application EP-A-0204095 (SMW Schneider Weisshaupt GmbH). The use of this type of chuck, however, requires voluminous and expensive jaw holders and robots since a different jaw set is needed for each diameter range and the jaw sets are stored in small replacement devices.

In a test arrangement of a flexible manufacturing system, the whole chucks were replaced, but due to the unacceptable high prices of the corresponding holders and manipulators, only one test system of this type could be implemented.

Patent applications DE-A-3726773 and EP-A-0303002 of the company Röhm also describe various solutions for automatic jaw adjustment, but due to operational safety problems and other problems making its use more difficult, this system has remained in a test phase, too. In this system, substantial alterations had to be carried out on the base machine. For example, the actuating device (or piston) provided with rack toothing had to be driven hydraulically. However, a direct feeding of the oil into the chucks rotating at a high rate was not feasible, therefore the operating oil was fed to the rotating inlets through longitudinal holes formed in the wall of the main spindle. This kind of inlets arranged along the great diameter of the main spindle, between the main bearings, provides a very disadvantageous solution. Additionally, a hydraulic pushing plate also had to be placed inside the chuck body. These considerations led to a multiple part, weak and too wide design of the chuck body.

Automatic jaw adjustment is disclosed in HU Pat. No. 217764 granted for the inventors of the present invention, as well as in the corresponding EP Pat. No. 1021267 and U.S. Pat. No. 6,343,797. In that invention, automated operation of the chuck requires a servo-mechanism provided with power and information transmission units, and a measuring system, all of which can be arranged only outside the cylindrical lateral surface of the chuck, which in turn, requires to break through the cylindrical surface, and the break-through allows to connect the servo-mechanism to a projecting non-cylindrical part of the cylindrical lock. The break-through must be even longer than the non-cylindrical part of the lock in order to allow the displacement of the lock. However, through the break-through, chips and cooling liquid may get into the internal parts of the assembly, which may cause damages or breakdown. The measuring system has to be arranged behind the protective cover of the machine tool, since sensors of the measuring system are extremely sensitive to pollutions. For protection against the chips and the cooling liquid, even extra protective covers are needed. Due to the above mentioned features, a machine tool equipped with this kind of chuck requires specific constructional modifications.

A further disadvantage of the above mentioned assembly is that the chuck body consists of two parts. These two parts are arranged in such a way that they encase and guide the control ring accommodated therebetween. Division of the chuck body results in a weakened construction in terms of rigidity and strength, and furthermore the cooling liquid may get into the system more easily because of the division.

The present invention is, in fact, a further development of the former invention, but it provides an even simpler, more rigid, more economical, safer and universal solution.

It is an object of the invention to provide a more economical construction for a chuck serving the needs arising in the flexible manufacturing processes better than ever before, wherein said chuck can easily adapt to the automated chucking of the work-pieces with different diameters, while it requires no (or in some cases at most minimal) alterations of the base machine and, in general, no use of any new executive, measuring or control unit. Furthermore, there is no need of breaking through the cylindrical lateral surface of the chuck body.

The above object is achieved by a chuck having a structure described in the introduction part, wherein the chuck body is in the form of a one-piece unit, and the control ring is encased by the chuck body and the rear centring disc so that the control ring can be rotated therebetween. The locking member of the second locking stage of the double locking coupling device is in the form of a cylindrical stud-shaped lock guided in an axial hole of the control ring, said lock being connected in its locked state, through its front surface, to an axially guided push-rod. The push-rod is arranged either in an entirely closed hole of the chuck body or in a closed hole of a protective ring of the main spindle.

An advantage of this kind of chuck is that the chuck body formed by a single part is much more rigid than the previous designs, and the push-rods are guided in entirely closed holes, which provides an excellent protection against the penetration of the chips and the cooling liquid.

In a preferred embodiment of the invention, the lock of the second locking stage of the double locking coupling device, which is guided in an axial hole of the control ring and has a cylindrical lateral surface, is shifted towards the front surface of the chuck body by a spring. In its locked state, one end of said lock projects into a locking hole of the chuck body, said locking hole having the same diameter as the axial hole of the control ring. Along the axis of the locking hole, a coaxial hole is formed as a through hole in the chuck body. The axially guided push-rod is arranged in said through hole so that it can be shifted therein. The inner end of said push-rod is connected to the end of the lock, whereas the outer end of said push-rod projects from the front surface of the chuck body. This arrangement provides a complete protection against the chips and the cooling liquid, and leading out the push-rod from the chuck on its front side allows to operate the chuck from the front side without the need of any alteration of the construction of the machine supporting the chuck.

In an other preferred embodiment of the invention, at stepping the jaws to an other diameter, the outer end of the push-rod projecting from the front surface of the chuck body is connected to an actuating device that is either gripped in the revolver head of the machine tool supporting the chuck or fixed to the cross-slide of the machine tool. This feature is advantageous because no extra servo-mechanism is to be mounted on the base machine, but the lock is operated through the push-rod by programming the motion of the slide of the base machine. This feature has a great significance because in addition to the need of forming a mounting place for the servo-mechanism on the base machine in the previous designs, power transmission cables had to be led thereto, as well as position sensing switching elements had to be built therein.

According to the present invention the slides of the machine tool provide the power for actuating the coupling device, whereas the measuring system of the slides makes the measuring systems of the servo-mechanism superfluous. It is an overall advantage of the invention that the only thing to do is to mount the chuck onto the machine tool and all of the motions and control procedures required for stepping the jaws to an other diameter are performed by the existing operating and measuring systems of the machine tool.

In an other preferred embodiment of the invention, the actuating device gripped in the revolver head of the machine tool supporting the chuck or fixed to the cross-slide of the machine tool is in the form of a bumper rod having a front surface perpendicular to the axis of the main spindle. This feature has the advantage that the slide carries out the actuating of the coupling device by means of an actuating device having a very simple structure.

In an other preferred embodiment of the invention, the actuating device fixed to the cross-slide of the machine tool supporting the chuck comprises a front surface perpendicular to the axis of the main spindle and two lateral surfaces perpendicular to said front surface. At stepping the jaws to an other diameter, these surfaces loosely encase the outer end of the push-rod projecting from the front surface of the chuck body in a U-shaped fashion with a spacing. The actuating device is shifted towards the chuck body by means of a spring. This embodiment has two advantages relative to the previous ones. First, the chuck may be mounted onto a simpler machine tool as well, wherein the machine tool is not equipped with a precise positioning means for the main spindle. This is due to that the chuck can be rotated into the 0 position by moving the slide of the machine tool tangentially through the U-shaped surface areas of the actuating device. Second, this rotational motion may be also used to rotate the chuck body relative to the control ring, thus the first locking stage may be also performed in simpler machine tools as well, wherein a slow and precise rotation of the main spindle is not provided.

In a further preferred embodiment of the invention, outside the outer end of the push-rod, a stud built in a non-movable manner projects from the front surface of the chuck body, wherein at coupling, said stud is encased in a U-shaped fashion by a groove of the non-springy part of the actuating device fixed to the cross-slide of the machine tool. The actuating device further comprising a springy part, the front surface of which is connected to the outer end of the push-rod. In this embodiment, the stud used for the rotation and the locking stud are separated, therefore the locking stud will have a longer life time.

In an other preferred embodiment of the invention, the outer end of the push-rod guided in said through hole of the chuck body extends up to the front surface of the chuck body, where at coupling, a stud-shaped end of the actuating device fixed to the cross-slide of the machine tool, intrudes into said through hole of the chuck body, while the actuating device is held in a radially movable manner, preferably by means of leaf springs. An advantage of this embodiment is that the required degree of rotation of the chuck body can be performed in a very easy way by utilizing the existing hole of the chuck body, said hole being adapted to guide the push-rod.

Finally, in an other preferred embodiment of the invention, the lock, which is movably inserted into an axial hole of the control ring, is shifted towards the main spindle by a spring. The lock, in its position adjacent the main spindle, is arranged between surface areas adapted to block its rotation, wherein these surface areas form a locking recess in a centring disc fixed to the chuck body. A projecting part of the front surface of the lock extends over the outer diameter of the centring disc fixed to the chuck body. In the unlocked state between the chuck body and the control ring, said projecting part of the lock is connected to a push-rod with a small spacing therebetween. The push-rod is guided in a hole of a protective ring fixed to the body of the machine tool, and the front end of the push-rod is arranged between the surface areas forming the locking recess of the centring disc and blocking its rotation. A small hydraulic cylinder and an orienting mechanism for adjusting the initial position of the push-rod is connected to the end of the push-rod adjacent the main spindle. This embodiment has the advantage that in machine tool factories where this type of chucks are often mounted onto the machine tools, operation of the chuck is fully hidden on the rear side and is properly protected against chips and cooling liquid without the need of breaking through the cylindrical lateral surface of the chuck.

Figure 2:
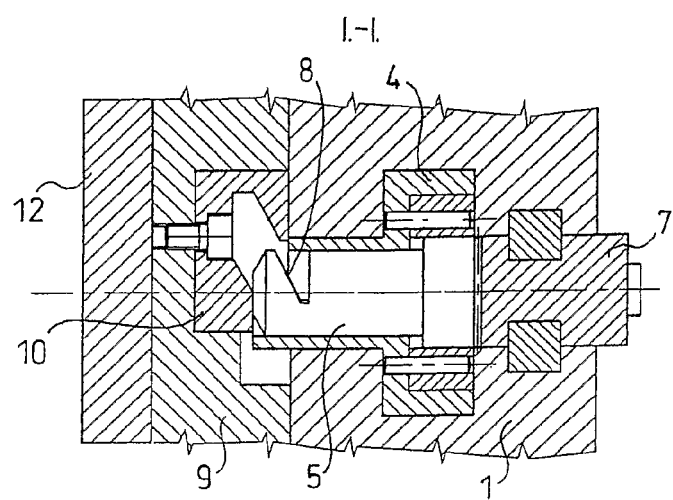
Figure 3:
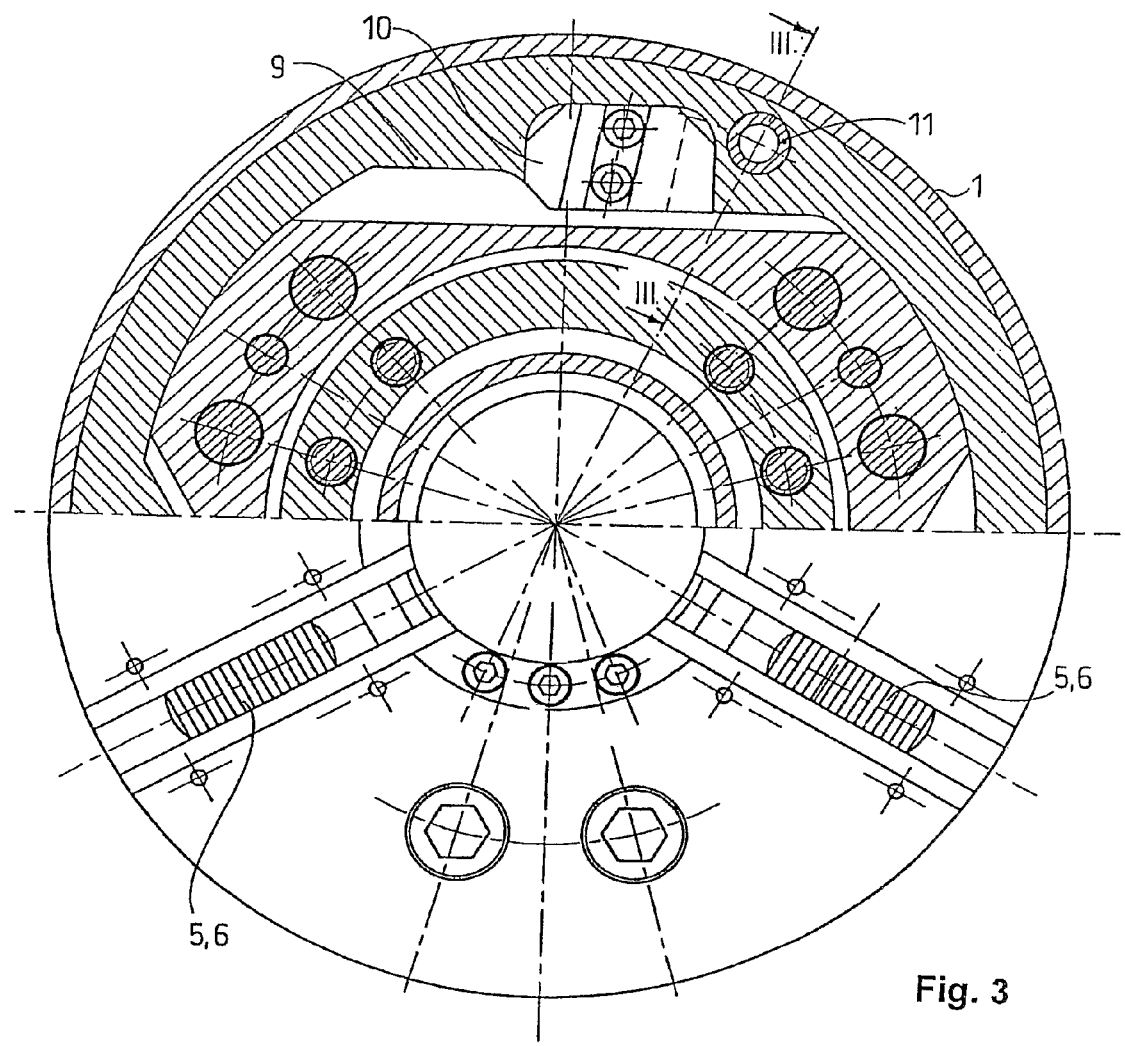
Figure 4:
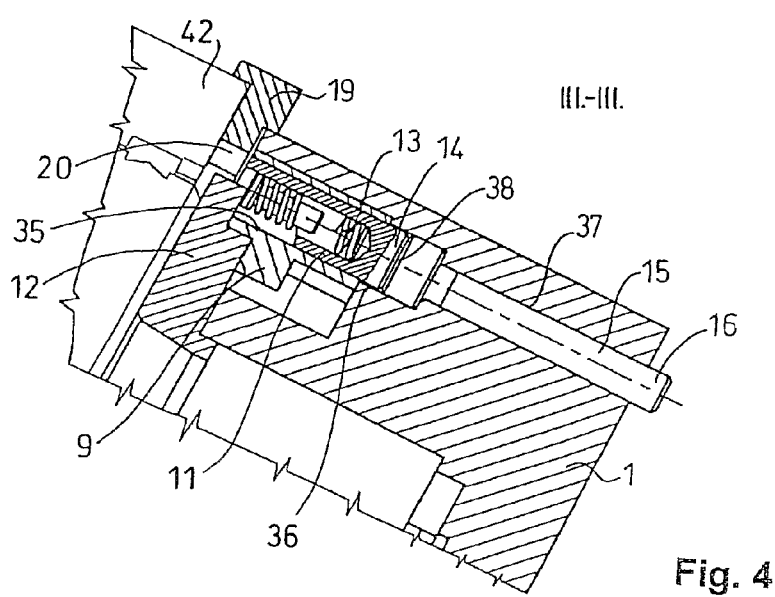
Figure 5:
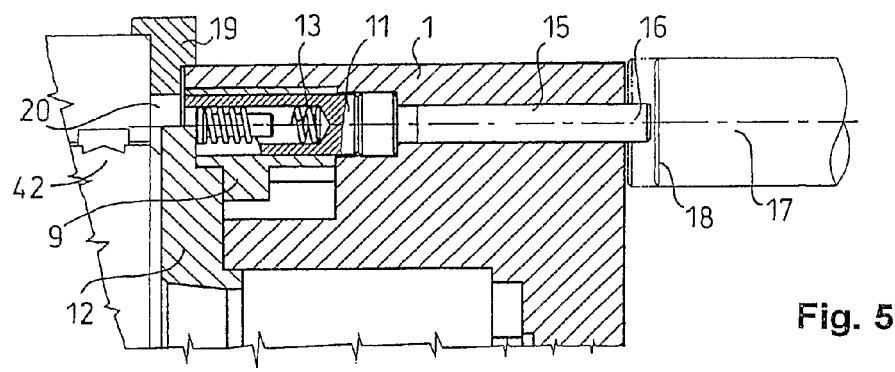
Figure 6:
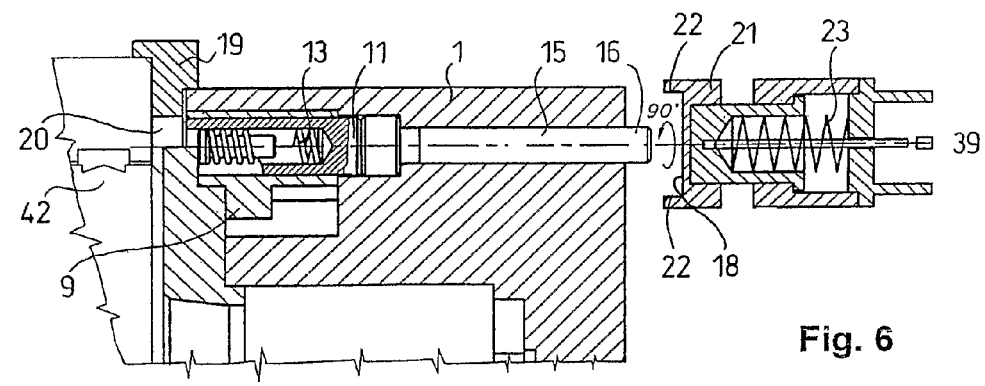
Figure 7:
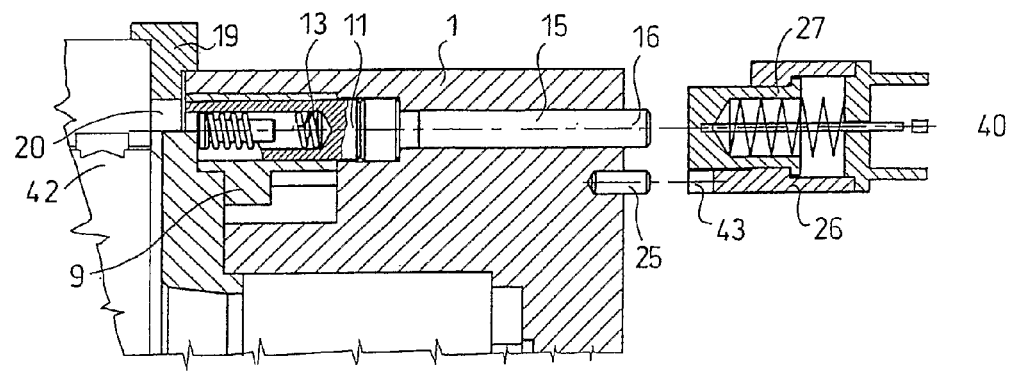
Figure 8:
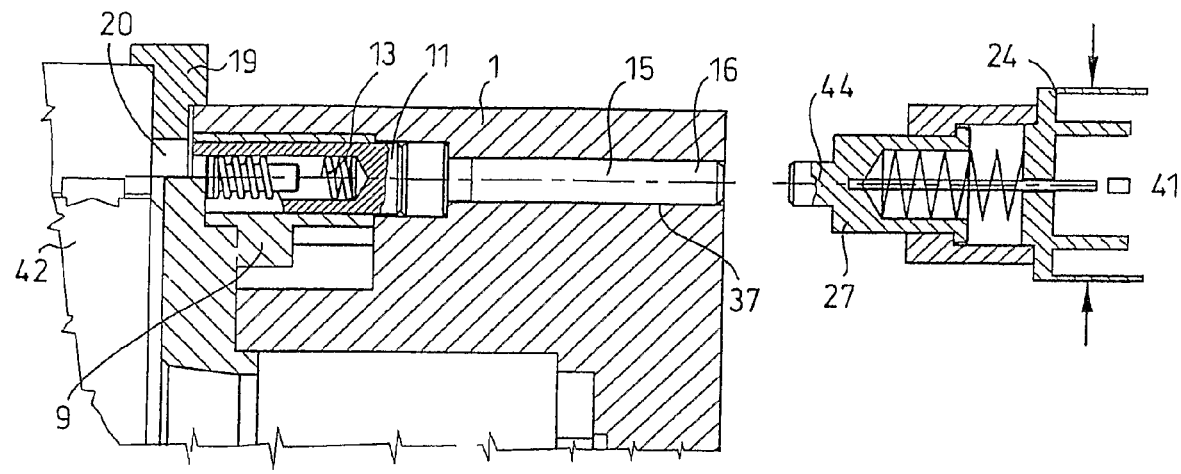
Figure 9:
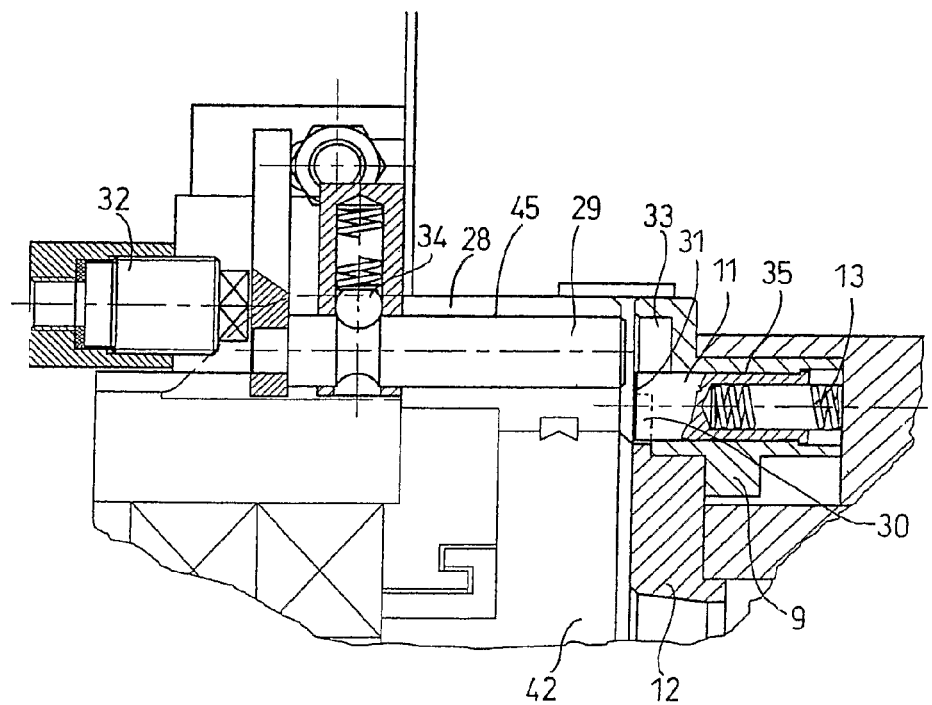

The invention will be better understood with reference to the accompanying figures wherein FIG. 1 is the longitudinal cross sectional view of the chuck according to an embodiment of the invention, FIG. 2 is a cross sectional view of the chuck along the line I-I shown in FIG. 1, FIG. 3 is a fragmentary cross sectional view of the chuck taken along the line II-II shown in FIG. 1 and the front view of the chuck, FIG. 4 is a fragmentary cross sectional view of the chuck taken along the line III-III shown in FIG. 3, FIG. 5 is the fragmentary cross sectional view of FIG. 4 additionally illustrating an actuating device according to an embodiment of the invention, FIG. 6 is the fragmentary cross sectional view of FIG. 4 additionally illustrating another actuating device according to a further embodiment of the invention, FIG. 7 is the fragmentary cross sectional view of FIG. 4 additionally illustrating yet another actuating device according to a further embodiment of the invention, FIG. 8 illustrates the actuating device of the chuck in the same cross sectional view as the previous figures, according to an other embodiment of the invention, and FIG. 9 illustrates the actuating device of the chuck in a fragmentary cross sectional view according to yet an other embodiment of the invention.

FIGS. 1 to 4 illustrate a preferred embodiment of the chuck according to the invention.

As shown in these figures, a central drawhead 2 is axially guided in an internal hole of the chuck body 1 having a cylindrical lateral surface, wherein said central drawhead 2 can be moved through a hole of the main spindle 42 of the machine tool supporting the chuck. The central drawhead 2 is connected to inner jaws 4 by means of a well-known straight-wedge mechanism, said inner jaws 4 being radially guided in the chuck body 1. Inside a hole of each inner jaw 4, said hole having two portions with different diameters, a coupling head 5 is axially guided, the front surface of which is provided with a rack toothing 6 to be engaged with a rack toothing 6 formed on the outer jaws 7. The outer jaws 7 are formed appropriately for fixing the chuck jaws used to grip the work-piece.

The engagement and disengagement of these rack toothings 6, as well as a very safe maintenance of the engaged state are performed by means of a double locking coupling device.

Elements of the primary locking stage of the double locking coupling device are illustrated in FIG. 2. Wedge-shaped control surface areas 8 formed on the rear side of the coupling heads 5 are connected to the respective surface areas of the wedge-shaped control members 10 fixed to the control ring 9. Due to the co-operating control surface areas of the coupling heads 5 and the wedge-shaped control members 10, the coupling heads 5 can be pushed ahead or pulled back, and in addition to it, at the normal position of the control ring 9, surface areas of the wedge-shaped control members 10, which are orthogonal to the axis of rotation, support and securely lock the coupling heads 5 when the front rack toothings 6 thereof are in an engaged state. In order to maintain this condition, the control ring 9 is not allowed to turn, which is guaranteed by a secondary locking stage.

Elements of the secondary locking stage are shown in FIG. 4. It can be easily understood from this figure that in an axial hole 35 of the control ring 9, a cylindrical stud-shaped lock 11 is guided that is pushed towards the front surface of the chuck by a spring 13 leaning against a centring disc 12. The spring 13 pushes the front end 14 of the lock 11 into a locking hole 36 formed in the chuck body 1, wherein the locking hole 36 is coaxial with the axial hole 35 of the control ring 9 and has the same diameter as said axial hole 35, thus preventing the control ring 9 from turning relatively to the chuck body 1.

By pushing the lock 11 to the left, another kind of locking action is also performed: the front surface of the front end 14 of the lock 11 engages with a push-rod 15, or to be more precise, with the inner end 38 thereof having a greater diameter, wherein said push-rod 15 is arranged in a hole 37 having a smaller diameter, said hole 37 constituting an imaginary extension of the locking hole 36 formed in the chuck body 1. The outer end 16 of the push-rod 15 projects from the front surface of the chuck. At stepping the chuck jaws to an other diameter, surface areas of the outer end 16 of the push-rod 15 are engaged with surface areas of the actuating devices 17, 39 or 40 (as shown in FIGS. 5 to 7) fixed in the revolver head or to the cross-slide of the machine tool supporting the chuck.

FIG. 5 illustrates an actuating device fixed in the revolver head or to the cross-slide of the machine tool supporting the chuck, according to an embodiment of the invention. In this embodiment, the actuating device 17 is in the form of a simple bumper rod, the front surface 18 of which pushes the push-rod 15 backwards, while it also pushes the lock 11 against the spring 13, by moving the base slide of the machine tool, such as a turning lathe, into the same direction as that of the main spindle. In response to this motion, locking between the control ring 9 and the chuck body 1 releases while another kind of locking mechanism becomes operative, i.e. in this position, left side surface areas of the lock 11 engage with the stationary surface areas of a ring 19 indirectly fixed to the body of the turning lathe, wherein said surface areas form a locking recess 20. Hence, a locking condition sets up between the control ring 9 and the stationary ring 19 fixed to the body of the turning lathe. In this state, when the main spindle 42 is slowly rotated, the chuck body 1 and the control ring 9 move relatively to each other. In response to this relative motion, the wedge-shaped control members 10 mounted on the control ring 9 pull the coupling head 5 backwards through the wedge-shaped control areas formed on the rear side of the coupling head 5.

Adjustment of the external jaws 7 guided in the chuck body 1 to a different diameter range is performed by stepping all of the three jaws simultaneously. By means of the stepping process, the outer jaws 7 may be adjusted to have either greater or smaller diameter.

Both kind of the stepping operations are combined of two independent motions, one of which is the axial motion of the central drawhead 2, whereas the other one is the axial motion of the coupling head 5, which is effectuated by turning the control ring 9 via the locking means as mentioned before.

Stepping adjustment of the outer jaws 7 to have a smaller diameter comprises the following actions:

I. The central drawhead 2 is pulled backwards, whereby the inner jaws 4 and the headpieces of the coupling heads 5 accommodated therein and having rack toothing 6 get into a small diameter range.

II. The coupling head 5 is pulled backwards, whereby the rack toothings 6 of the coupling heads 5 inside the inner jaws 4 and those of the outer jaws 7 disengage. This action requires the chuck body 1 to turn relatively to the control ring 9, which is effectuated by rotating the main spindle 42 while the control ring 9 is prevented from turning by means of locking.

III. The central drawhead 2 is pushed ahead, whereby it pushes all of the three inner jaws 4 to get into a greater diameter range, wherein the inner jaws 4 do not carry the outer jaws 7 along due to the disengaged condition of the respective rack toothings 6.

IV. In response to rotating the main spindle 42 into the opposite direction, the coupling head 5 is pushed ahead, whereby the rack toothings 6 of the coupling heads 5 inside the inner jaws 4 and those of the outer jaws 7 become engaged.

The inwards stepping procedure for reducing the diameter may be repeated any times. One stroke of the central drawhead 2 is defined by a two-pitch displacement of the coupling head 5. By using a rear position sensing switch, displacement of the central drawhead 2 may be halved to perform a one-pitch displacement. Hence, well-overlapping diameter ranges have been created.

Stepping adjustment of the outer jaws 7 to have a greater diameter may be completed by applying the above mentioned steps in a different sequence, wherein the altered sequence is composed of steps II., I., IV. and III.

FIG. 6 illustrates an other embodiment of the actuating device of the chuck, according to the invention, wherein the actuating device 39 also has the functionality of operating the lock 11 and the push-rod 15. The actuating device 39 is preferably fixed to the cross-slide of the turning lathe. The actuating device 39 is provided with a jaw 21 having a front surface 18 and two lateral surfaces 22 perpendicular thereto. These surfaces encase the outer end 16 of the push-rod 15 with spacing, in a U-shaped fashion. The jaw 21 of the actuating device 39 is pushed into its front position by a spring 23. At coupling, the base slide of the turning lathe pushes the actuating device 39 ahead and the front surface 18 becomes seated on the outer front surface of the push-rod 15, while the spring 23 forces the push-rod 15 and the lock 11 to the left.

The actuating device 39 is used for the purpose that if the main spindle 42 is not able to stop exactly at the 0 position or to perform a slow and precise motion, one can use the chuck with automated jaw stepping even for such machine tools having rather simple control. Therefore, initially, the lock 11 is not arranged against the locking recess 20 of the stationary ring 19 and the spring 23 cannot push the push-rod 15 or the lock 11 to the left. Afterwards, the cross-slide first pushes the jaw 21 of the actuating device 39 into one direction and then into the opposite direction, wherein the lateral surface areas 22 of the jaw 21 tangentially push the outer end 16 of the push-rod 15 first into one direction and then into the opposite direction, thus rotating the chuck exactly into the 0 position. When the lock 11 meets the locking recess 20 of the ring 19, the spring 23 pushes the push-rod 15 to the left, whereby the lock 11 couples the control ring 9 to the stationary ring 19 instead of the chuck body 1. In this situation, turning the main spindle 42 induces a relative motion between the chuck body 1 and the control ring 9, said motion allowing to pull the coupling head 5 backwards and thus to complete step II of the stepping procedure. After this locking/coupling operation has finished, the outer end 16 of the push-rod 15 still has a remaining part that projects from the front surface of the chuck, because the spring 23 can push the push-rod 15 only until the left-side front surface of the push-rod 15 has seated on the lateral surface of the control ring 9.

The actuating device 39 shown in FIG. 6 also performs a precise turning and returning of the main spindle 42, i.e. by moving the cross-slide, lateral surface areas 22 of the jaw 21 can shift the outer end 16 of the push-rod 15 through their tangential motion, thus the main spindle 42 may be precisely rotated via moving the cross-slide.

In case of a rather course adjustment, the chuck may be positioned by means of the lateral surface 22 of the jaw 21 as well, i.e. the chuck may be adjusted to the 0 position, and then the actuating device 39 grips the outer end 16 of the push-rod 15 between the lateral surface areas 22.

Another embodiment of the actuating device of the chuck according to the invention is illustrated in FIG. 7. In this embodiment, the elements for the axial actuation of the push-rod 15 are separated from the elements of the rotational operation of the main spindle 42. To the latter end, an extra stud 25 is built in the wall of the chuck body 1, through which the chuck is rotated by non-springy parts 26 of the actuating device 40 shown in FIG. 7, whereas the springy part 27 thereof is only used for shifting the push-rod 15 and the lock 11 to the left. This arrangement is particularly beneficial when the length of the projecting outer end 16 of the push-rod 15 is intended to be reduced, for example, to its half.

Yet another embodiment of the actuating device of the chuck according to the invention is illustrated in FIG. 8. In this embodiment of the actuating device 41, the outer end 16 of the push-rod 15 guided in the through hole 37 of the chuck body 1, extends just up to the front surface of the chuck. At coupling, the projecting stud-shaped end 44 of the springy part 27 of the actuating device 41 intrudes into the through hole 37, thereby pushing the push-rod 15 backwards. The actuating device 41 turns the main spindle 42 by means of this stud-shaped end 44. At the same time, the through hole 37 with the push-rod 15 moves along an arcuate path, therefore the actuating device 41 should be designed to be capable of displacing also in the radial direction, which, in certain cases, is assisted by leaf springs 24.

In the above described embodiments, beside the actuating of the tightening mechanism of the chuck, only the programmed motions of the slides are necessary for the automated jaw adjustment.

Another embodiment of the actuating device of the chuck according to the invention is illustrated in FIG. 9. In this embodiment, actuation of the lock 11 guided in the axial hole 35 of the control ring 9 is carried out by a push-rod 29 guided in a hole 45 of a protective ring 28 fixed to the machine tool supporting the chuck. In this arrangement, the spring 13 accommodated in the lock 11 pushes the lock 11 to the left. Locking the lock 11 to the chuck body 1 is performed in such a way that the lock 11 intrudes into a locking recess 30 formed on the left-side rim of the centring disc 12. This locking recess 30, however, leaves a projecting part 31 of the lock 11 free. At coupling, the front surface of the push-rod 29 lean against this projecting part 31. The push-rod 29 can be pushed to the right by means of a hydraulic cylinder 32, which means that unlike the above embodiments, the lock 11 is now operated from the rear side. During this operation, the push-rod 29 shifted by the hydraulic cylinder 32 to the right shifts the lock 11 partly to the right, thus uncoupling the lock 11 and the centring disc 12 fixed to the chuck body 1. At the same time, the right end of the push-rod 29 intrudes into a locking recess 33 formed in the control ring 9. By this way, the push-rod 29 also provides a locking function, i.e. it fixes the control ring 9 to the stationary parts of the base machine. After the piston of the hydraulic cylinder 32 has returned, the push-rod 29 is shifted back to its initial position by the spring 13, while its exact position is adjusted by an orienting mechanism 34.

The servo-mechanism comprising the elements mentioned before is fixed to the rear wall of the protective ring 28, so it does not require the forming of a base surface on the casting of the spindle body, although a slight recess milling, nevertheless, is needed for providing a place for accommodation. This system is recommended to those turning lathe manufacturers that do not intend to build an actuating device either into the revolver head or to the cross-slide, but intend to operate the chuck in the form of an entirely closed and protected system with a compact chuck body therein.

The advantage of the chucks according to the invention is that they provide a very economical and reliable solution for flexible manufacturing, where the main requirement is the flexible adaptation of the chucks to the different diameters of the work-pieces to be chucked.

The basis of the economic operation is that existing elements already mounted on the machine tool, in particular on a turning lathe, are used for performing the automated stepping functions. FIGS. 1 to 8 illustrate embodiments wherein no extra measuring, inspecting or controlling units are to be mounted onto the base machine. This multifunction operation is provided by the executing, measuring and controlling units of the central drawhead, the drive of the main spindle and the slides of the base machine. In the embodiments shown in FIG. 6 to 8, there is no need of even a slow and precise drive for positioning the main spindle.

Another advantage of the invention is that the chuck body 1 is in the form of a one-piece, compact and rigid unit, which offers a complete protection and security for the internal operative parts of the chuck.

A double safety function is provided by the lock 11 itself, i.e. in the normal operation of the chuck, it reliably prevents the control ring 9 from turning, while in the jaw stepping mode, it reliably locks start of the main spindle 42.

It is an advantage of the embodiment illustrated in FIG. 9 that the chuck body 1 is formed as a one-piece, compact and rigid unit. Although this embodiment comprises a servo-mechanism, this servo-mechanism is accommodated in an entirely hidden and protected place, and furthermore, the lock 11 is a very simple, double-functional and well-protected element.

The chuck according to the invention has several benefits in view of the prior art solutions. It allows a quick, reliable and economic way of the automated jaw adjustment of the outer jaws together with the chuck jaws, with respect to the different sizes of the work-pieces, and additionally it may be used universally for every diameter range. Furthermore, it can be easily mounted onto the base machine without any alteration thereof. Nevertheless, since the chuck body may be formed as a one-piece unit, a simple and rigid structure is resulted that prevents the chips and the cooling liquid from getting inside chuck.

The invention claimed is:

1. A chuck for flexible manufacturing, said chuck comprising a chuck body (1) having a cylindrical lateral surface, a central drawhead (5) guided axially in a central hole of the chuck body (1) and being movable through a hole of the main spindle (42) of the machine tool supporting the chuck and further connected to inner jaws (4) radially guided in the chuck body (1) through a straight-wedge mechanism, outer jaws (7) also radially guided in the chuck body (1) and adapted to be equipped with chuck jaws for chucking a work-piece and, through their rack toothings (6), to be engaged with and disengaged from the rack toothings (6) of coupling heads (5), said coupling heads (5) being built in the inner jaws (4) and guided axially therein, wherein said coupling heads (5) comprise a double locking coupling device, the first locking stage of said coupling device includes wedge-shaped control members (10) fixed to a control ring (9), said control members (10) being engaged with surface areas formed on the inner front surface of the axially movable coupling heads (5), whereas the second locking stage includes an additional locking member directly connected to the control ring, wherein the surface areas of said additional locking member are engaged with the chuck body (1) or a centring disc (12) fixed to the chuck body (1), in one coupling position of the coupling device, whereas in the other coupling position of the coupling device, said surface areas are engaged with stationary surface areas of the machine tool supporting the chuck, characterised in that the chuck body (1) is in the form of a one-piece unit, wherein the control ring (9) is encased by the chuck body (1) and the rear centring disc (12) so that the control ring (9) can be rotated therebetween, and the locking member of the second locking stage is in the form of a cylindrical stud-shaped lock (11) guided in an axial hole (35) of the control ring (9), said lock (11) being connected in its locked state, through its front surface, to an axially guided push-rod (15, 29), wherein said push-rod (15, 29) is arranged either in an entirely closed hole of the chuck body (1) or in a closed hole (45) of a protective ring (28) of the main spindle (42).

2. The chuck of claim 1, characterised in that the lock (11) of the second locking stage of the double locking coupling device, which is guided in an axial hole (35) of the control ring (9) and has a cylindrical lateral surface, is shifted towards the front surface of the chuck body (1) by a spring (13), and in the locked state, one end (14) of said lock (11) projects into a locking hole (36) of the chuck body (1), said locking hole (36) having the same diameter as the axial hole (35) of the control ring (9), wherein along the axis of the locking hole (36), a coaxial hole (37) is formed as a through hole in the chuck body (1), wherein the axially guided push-rod (15) is arranged in said through hole (37) so that it can be shifted therein, the inner end (38) of said push-rod (15) being connected to the end (14) of the lock (11), whereas the outer end (16) of said push-rod (15) projects from the front surface of the chuck body (1).

3. The chuck of claim 2, characterised in that at stepping the jaws to an other diameter the outer end (16) of the push-rod (15) projecting from the front surface of the chuck body (1) is connected to an actuating device (17, 39, 40, 41), said actuating device (17, 39, 40, 41) being either gripped in the revolver head of the machine tool supporting the chuck or fixed to the cross-slide of the machine tool.

4. The chuck of claim 3, characterised in that said actuating device (17) gripped in the revolver head of the machine tool supporting the chuck or fixed to the cross-slide of the machine tool is in the form of a bumper rod having a front surface (18) perpendicular to the axis of the main spindle (42).

5. The chuck of claim 3, characterised in that said actuating device (39) fixed to the cross-slide of the machine tool supporting the chuck comprises a front surface (18) perpendicular to the axis of the main spindle (42) and two lateral surfaces (22) perpendicular to said front surface (18), wherein at stepping the jaws to an other diameter, said surfaces (18, 22) loosely encase the outer end (16) of the push-rod (15) projecting from the front surface of the chuck body (1) in a U-shaped fashion with a spacing, and wherein said actuating device (39) is shifted towards the chuck body (1) by means of a spring (23).

6. The chuck of claim 3, characterised in that outside the outer end (16) of the push-rod (15), a stud (25) built in a non-movable manner projects from the front surface of the chuck body (1), wherein at coupling, said stud (25) is encased in a U-shaped fashion by a groove (43) of the non-springy part (26) of the actuating device (40) fixed to the cross-slide of the machine tool, and wherein said actuating device (40) further comprising a springy part (27), the front surface of which is connected to the outer end (16) of the push-rod (15).

7. The chuck of claim 3, characterised in that said outer end (16) of the push-rod (15) guided in said through hole (37) of the chuck body (1) extends up to the front surface of the chuck body (1), where at coupling, a stud-shaped end (44) of the actuating device (41) fixed to the cross-slide of the machine tool, intrudes into said through hole (37) of the chuck body (1), while the actuating device (41) is held in a radially movable manner, preferably by means of leaf springs (24).

8. The chuck of claim 1, characterised in that said lock (11) movably inserted into an axial hole (35) of the control ring (9) is shifted towards the main spindle (42) by a spring (13), wherein said lock (11), in its position adjacent the main spindle (42), is arranged between surface areas adapted to block its rotation, said surface areas forming a locking recess (30) in a centring disc (12) fixed to the chuck body (1), and wherein a projecting part (31) of the front surface of the lock (11) extends over the outer diameter of the centring disc (12) fixed to the chuck body (1), whereas in the unlocked position between the chuck body (1) and the control ring (9), said projecting part (31) of the lock (11) is connected to a push-rod (29) with a small spacing therebetween, said push-rod (29) being guided in a hole (45) of a protective ring (28) fixed to the body of the machine tool, and the front end of said push-rod (29) being arranged between said surface areas forming said locking recess (30) in the centring disc (12) and blocking its rotation, and wherein a small hydraulic cylinder (32) and an orienting mechanism (34) for adjusting the initial position of the push-rod (29) is connected to the end of the push-rod (29) adjacent the main spindle (42).

* * * * *